(12) United States Patent
Blanc et al.

(10) Patent No.: US 12,379,447 B1
(45) Date of Patent: Aug. 5, 2025

(54) DEVICE AND METHOD FOR GEOLOCATION IN NEARBY ENVIRONMENTS

(71) Applicant: EASII IC, Grenoble (FR)

(72) Inventors: Fabrice Blanc, Gonneville sur Mer (FR); Steven Huet, Grenoble (FR); Amaury Tremblay, Versailles (FR); Jean-Paul Goglio, Pontcharra (FR)

(73) Assignee: EASII IC, Grenoble (FR)

( * ) Notice: Subject to any disclaimer, the term of this patent is extended or adjusted under 35 U.S.C. 154(b) by 107 days.

(21) Appl. No.: 18/269,610

(22) PCT Filed: Dec. 27, 2021

(86) PCT No.: PCT/FR2021/052459
§ 371 (c)(1),
(2) Date: Jun. 26, 2023

(87) PCT Pub. No.: WO2022/144525
PCT Pub. Date: Jul. 7, 2022

(30) Foreign Application Priority Data

Dec. 28, 2020 (FR) ..................................... 20/14181

(51) Int. Cl.
*G01S 5/16* (2006.01)
*G01S 1/70* (2006.01)
*G01S 5/00* (2006.01)

(52) U.S. Cl.
CPC ............ *G01S 5/013* (2020.05); *G01S 1/7038* (2019.08); *G01S 5/009* (2013.01); *G01S 5/16* (2013.01)

(58) Field of Classification Search
CPC ........ G01S 5/013; G01S 1/7038; G01S 5/009; G01S 5/16
See application file for complete search history.

(56) References Cited

FOREIGN PATENT DOCUMENTS

EP 1760013 A1 3/2007

OTHER PUBLICATIONS

International Search Report for corresponding application PCT/FR2021/052459 filed Dec. 27, 2021. Mail date Apr. 5, 2022.

*Primary Examiner* — Mathew Franklin Gordon
(74) *Attorney, Agent, or Firm* — CANTOR COLBURN LLP

(57) ABSTRACT

The invention relates to an identification and location device for remotely locating and identifying predetermined areas (Z) belonging to a nearby environment, the identification and location device comprising: —a plurality of light radiation emission sources(S) located in predetermined areas (Z), each light radiation emission source(S) being connected to the electrical mains by a control circuit and configured to emit modulated light radiation (L), —a portable receiver device (R) which is capable of receiving and processing the light radiation (L) emitted by the light radiation emission sources(S) and which is configured to generate an item of identification and location information relating to the predetermined area (Z). The invention also relates to an identification and location method for remotely locating and identifying predetermined areas (Z) belonging to a nearby environment.

13 Claims, No Drawings

DEVICE AND METHOD FOR GEOLOCATION IN NEARBY ENVIRONMENTS

TECHNICAL FIELD

The present disclosure concerns a nearby-environment geolocation device, in other words an identification and location device making it possible to remotely locate and identify predetermined areas belonging to a nearby environment.

The disclosure also concerns an identification and location method making it possible to remotely locate and identify predetermined areas belonging to a nearby environment.

The disclosure applies in particular to fields where it is desired to alert and inform a user about objects around him or about what he is looking at from a distance. For example, in a museum it may be interesting to provide a system that will distribute multimedia information to the visitor according to the work he is looking at while taking into account the fact that there are multiple works on the same wall or in the same room. Similarly, a blind person could benefit from an audio guidance system that takes into account the identification and location of different areas or obstacles in front of him.

In the following, the term «area» can correspond to a surface or spatial area of the nearby environment but can also correspond to an object that would need to be located and identified.

BACKGROUND

There is a need to identify or even precisely locate predetermined areas or objects located in a nearby environment, in particular at a distance of several meters.

Several technologies dedicated to the identification of areas or objects are known such as radio beacons called «i-Beacons», radio tags of the <<RFID> type or even optical codes of the «QR code» type, or even bar codes. These technologies are satisfactory in that they make it possible to identify and locate areas or objects.

However, none of these technologies allows precise remote location. Indeed, the i-Beacons have a long transmission range but emit signals in all directions in space, which generally makes their location by a geolocation device imprecise. The RFID radio tags generally have a low transmission range, typically a few centimeters at most, which prevents them from being located at distances of several meters and which considerably constrains the possible applications. The optical codes such as QR codes or bar codes also require significant proximity to the geolocation device. Similarly, systems based on electronic imaging allow detection of simple shapes or bright colors, but require proximity to the targets to be detected as well as focusing, and present limits for an identification method to a few simple combinations of colors and/or basic shapes, which is equivalent to a limited number of bits.

Furthermore, in these known solutions, the receiver device requires quite complex, often specific equipment, to be able both to receive the signals coming from the RFID or QR-code tags, but also to be able to frequently transmit the prompt signals necessary for the identification (a wave to the RFID tag to electrically activate it; a light signal for reading a bar code or a QR code, etc.), but also all the systems necessary for the determination of relative positions. In the state of the art, the receiver device comprises on-board systems to determine its own geospatial position and also to determine the relative position of the different sources associated with the different areas. It is the receiver device that comprises the computational intelligences for this purpose. At the same time, the signals coming from the different areas do not include data relating to the position of the identification means, which in addition to the complexity of the receiver device, may confer possible imprecision or uncertainty on the determined positions.

The present disclosure aims to solve all or part of the drawbacks mentioned above.

The technical problem underlying the disclosure therefore consists in providing a simple and economical geolocation device making it possible to identify at a distance of several meters and to precisely locate areas or objects located in the same environment around the geolocation device, further making it possible to simplify the nature of the receiver device and to improve the precision and certainty of the positions determined for the different areas.

BRIEF SUMMARY

To this end, the present disclosure relates to an identification and location device making it possible to remotely locate and identify predetermined areas (or objects) belonging to a nearby environment, said identification and location device comprising:
  a plurality of light radiation emission sources located in the predetermined areas, each light radiation emission source being connected to the electrical mains by a driving circuit and configured to emit a modulated light radiation, each area being equipped with such a light radiation emission source, the light radiation emitted by each light radiation emission source being representative of a unique characteristic associated with the light radiation emission source which emitted said light radiation; and
  a portable receiver device capable of receiving and processing the light radiation emitted by the light radiation emission sources and configured to generate, for each received light radiation and by demodulation processing from said light radiation, an identification and location information relating to the predetermined area in which is located the light radiation emission source which emitted this received and processed light radiation.

By light radiation it should be understood a light ray emitted by a light source such as a lamp for example, and therefore the light radiation emission source can refer to a lamp for example. The arrangements according to the disclosure allow a precise location of multiple areas located in the same environment and at a distance of several meters from the receiver device.

Advantageously, the identification and location device uses properties of modulated light as well as interference between several light radiation emission sources in order to identify and locate areas or objects in the nearby environment.

In this document, the concept of «nearby environment» can be defined as being an environment located around the receiver device, at a distance from the receiver device such that the light radiation emitted by the different light radiation emission sources are all received by the receiver device. In practice, this distance is a few meters.

The identification and location device may also have one or several of the following features, taken alone or in combination.

Thus, and according to one possibility, the light radiation emitted by each light radiation emission source is phase and/or frequency modulated.

The receiver device can generate an identification and location information relating to the predetermined area by frequency demodulation processing when the light radiation emitted by the light radiation emission source is frequency modulated.

According to an alternative or combinable possibility, the receiver device generates an identification and location information relating to the predetermined area by phase demodulation processing when the light radiation emitted by the light radiation emission source is phase modulated.

According to one possibility, the receiver device may be a smartphone of a user of the described identification and location device.

Furthermore, unlike the state of the art presented above, the receiver device does not require complex or specific equipment. It must be able to receive and process the light signals coming from the different light radiation emission sources but have no need to emit the prompt signals necessary for the identification. The receiver device also does not need to determine its own position. In the solution according to the disclosure, it is the light radiation emission sources which include elements for determining their own positions, as well as the computational intelligence for this purpose, and the light signal emitted by each source can include data relating to the geospatial position of the source. Thus, the receiver device can be simple and inexpensive and the solution described here eliminates the possible imprecisions or uncertainties on the determined positions.

According to one embodiment, the identification of the predetermined area is carried out at a distance of several meters, for example a distance of more than 4 meters.

The predetermined area can refer to a spatial area included in said nearby environment where there is a piece of furniture or an artwork, for example.

The frequency and/or phase modulation of the light radiation in each light radiation emission source can take place under the action of an electrical circuit powered by the electrical mains, known as the driving circuit or «driver».

According to one embodiment, the frequency modulation of the light radiation can be a frequency shift keying, in other words an FSK type modulation.

According to one embodiment, a first emitted frequency is associated with a first binary symbol, a second emitted frequency is associated with a second binary symbol, and a third emitted frequency refers to a separation frequency between the first and second binary symbols.

According to one possibility, a substantially constant ratio exists between the values of the first, second and third emitted frequencies.

Advantageously, the use of a light radiation promotes the directivity of the emitted light radiation, in other words the light radiation follows a trajectory defined by a straight line.

The unique characteristic can for example refer to an n-bit code (where n is a natural number greater than or equal to two), in particular a 32-bit code for example, the code being different for each predetermined area.

In the identification and location device, each light radiation emission source may comprise at least one light-emitting diode. Each light-emitting diode may have an ability to emit the light radiation when it is connected to the electrical mains through the driving circuit.

According to one possibility, the light-emitting diode is an LED-type lamp driven by a driving circuit converting an alternating voltage into a direct or square-wave voltage.

In the identification and location device, each light radiation emission source may include a non-isolated electrical rectifier circuit and a circuit for storing said unique characteristic associated with said light radiation emission source.

For the purposes of the disclosure, by non-isolated electrical rectifier circuit it should be understood a circuit that electrically converts an alternating current AC signal to a direct current DC signal comprising no isolation element such as a transformer for example.

According to one embodiment, the storage circuit is an electrically programmable non-volatile memory circuit such as an EPROM or EEPROM type memory for example.

In the identification and location device, the unique characteristic associated with each light radiation emission source can be an individual identifier which comprises a plurality of binary symbols.

According to one embodiment, the plurality of binary symbols refers to a number in binary base, for example 32 bits.

In the identification and location device, the receiver device comprises a detection component capable of detecting the light radiation emitted by at least one of the light radiation emission sources.

The detection component can be a photodetector component such as a photodiode or a phototransistor for example.

According to one possibility, the photodetector component is integrated in an active pixel sensor, in particular a metal-oxide semiconductor active pixel sensor of the CMOS sensor type.

The detection component converts, for example, the received light radiation into an electrical signal to be processed.

The receiver device may comprise a processing circuit capable of processing by (frequency and/or phase) demodulation the received light radiation and of identifying the unique characteristics associated with the light radiation emission sources of the plurality of light radiation emission sources.

The identification and location information relating to a predetermined area is generated by the receiver device following the frequency and/or phase demodulation of the received light radiation.

The unique characteristic associated with each light radiation emission source may refer to the individual identifier of the light radiation emission source.

Alternatively or in combination, the unique characteristic associated with the light radiation source S is representative of a geospatial position occupied by said light radiation source.

The light radiation source can comprise hardware and/or software elements, for example a GPS-type sensor and an associated processing unit, configured to determine the geospatial position of the light radiation source.

The processing circuit can for example refer to a processor or a microcontroller on which is executed an algorithm for phase or frequency demodulating the electrical signal originating from the light radiation emitted by the emission source and received by the receiver device, as well as an electrical signal digitization circuit of the analog-digital converter type.

The frequency demodulation algorithm is used for example to extract frequencies comprised in the light signal emitted by the light radiation emission source and received by the receiver device and to associate the corresponding binary symbols therewith in order to extract the individual identifier relating to the light radiation emission source.

The receiver device can be connected to a storage system storing location and identification information relating to the predetermined areas and making it possible to identify the identification and location information relating to a predetermined area from the identified unique characteristic associated with the light radiation emission source located in this predetermined area, the storage system being comprised in a storage component or in a computer database accessible via an Internet network.

The storage component can for example refer to a memory circuit of a microprocessor The identification of the unique characteristics associated with the emission sources of the plurality of emission sources is done by comparing the unique characteristic associated with the light radiation emission source with reference location and identification information among location and identification information relating to the predetermined areas stored in a storage component of the receiver device or stored in a computer database accessible via an Internet network.

The receiver device comprises a digital transmission element.

The digital transmission element can for example be used to transmit the individual identifier relating to the light radiation emission source to an operating device such as a mobile phone of the smartphone type.

According to one possibility, the digital transmission element can be wired or wireless.

In the identification and location device, at least one element, selected from the group comprising the light radiation emission sources and the receiver device, comprises at least one optical component selected among a focusing member capable of focusing all or part of the light radiation which goes from the emission source to the receiver device and an optical module comprising a masking member.

According to one embodiment, the light radiation focusing member is placed on the detection component.

The focusing member can for example refer to a converging lens.

The masking member can for example refer to a tube with a length substantially comprised between 5 mm and 10 mm and attached to the photodetector.

The present disclosure also relates to an identification and location method making it possible to remotely locate and identify predetermined areas belonging to a nearby environment, the method comprising the following steps of:
  arranging a plurality of light radiation emission sources, where each predetermined area comprises at least one of said light radiation emission sources, each light radiation emission source being connected to the electrical mains by a driving circuit and configured to emit modulated light radiation;
  modulating the light radiation under the action of the driving circuit, the light radiation being representative of a unique characteristic associated with the light radiation emission source which is capable of emitting the light radiation; emitting light radiation towards a receiver device;
  receiving and processing by demodulation by the receiver device at least one light radiation emitted by the plurality of light radiation emission sources; and
  generating, for each received and processed light radiation, a location and identification information relating to the predetermined area in which is located the light radiation emission source which emitted the received and processed light radiation.

The light radiation emitted by the plurality of light radiation emission sources may be frequency and/or phase modulated.

According to one possibility, for a given light radiation emitted by one of the light radiation emission sources, the frequency modulation of the light radiation refers to a variation of a frequency of the light radiation so that the frequency has a value corresponding to a first frequency, a value corresponding to a second frequency and a value corresponding to a third frequency.

There can be a constant ratio between the values of the first, second and third frequency. For example, the first frequency can be equal to twice the second frequency, and the third frequency can be equal to twice the first frequency.

According to one implementation, an emission duration of the light radiation at a frequency equal to the first frequency is equal to an emission duration of the light radiation at a frequency equal to the second frequency, and an emission duration of the light radiation at a frequency equal to the second frequency is equal to an emission duration of the light radiation at a frequency equal to the third frequency.

The described method also comprises a step of transmitting, by the receiver device, the location and identification information relating to the predetermined area in which is located the light radiation emission source which emitted the received and processed light radiation to an operating device.

The step of receiving and processing the at least one light radiation may comprise the following sub-steps of:
  converting by a photodetector comprised in the receiver device at least one acquired light radiation into an electrical signal;
  dividing the electrical signal into a plurality of analysis intervals;
  determining a binary symbol relating to each analysis interval comprised in the plurality of analysis intervals based on a frequency or phase analysis of the electrical signal; and
  identifying the unique characteristic associated with the light radiation emission source which emitted the light radiation based on the determination of the binary symbol relating to each analysis interval comprised in the plurality of analysis intervals.

The division of the electrical signal into a plurality of analysis intervals can for example refer to a separation of the electrical signal into a plurality of time intervals during which the electrical signal has a frequency equal to the first frequency, or else a frequency equal to the second frequency, or else a frequency equal to the third frequency.

According to one possibility, the determination of the binary symbol relating to each analysis interval is done by identifying a frequency predominantly present in each analysis interval. The identification of the predominantly present frequency can for example be done by a frequency analysis of the Fourier transform or FFT type.

The step of receiving and processing the at least one emitted light radiation further comprises the following sub-steps of:
  acquiring at least one light radiation emitted during an acquisition duration; and
  comparing the unique characteristic associated with the light radiation emission source with reference location and identification information among location and identification information relating to the predetermined areas stored in a storage component of the receiver device or stored in a computer database accessible via an Internet network.

According to one possibility, the acquisition duration of the light signal is calculated so as to take into account a sampling duration of the light signal, a time tolerance relating to the operation of the driving circuit and a minimum time interval necessary for the acquisition of the unique characteristic associated with the light radiation emission source.

According to one possibility, the reference location and identification information is recorded in a dedicated digital location.

The method can further advantageously comprise a detection of the interferences of the at least one light radiation emitted from the light radiation emission source serving to delimit and/or separate the predetermined areas.

In other words, the locations of the junctions between the predetermined areas are determined by the receiver device in a very simple way, by determining the places in space where it is not possible to implement the step of generating the location and identification information.

BRIEF DESCRIPTION OF THE DRAWINGS

Other aspects, aims, advantages and features of the disclosure will appear better on reading the following detailed description of preferred embodiments thereof, given as a non-limiting example, and made with reference to the appended drawings in which:

FIG. 1 is a schematic representation of an identification and location device comprising a plurality of light radiation sources emitting light radiation to a receiver device.

FIG. 2 is a schematic representation of a frequency modulation of the light radiation emitted by the plurality of light radiation sources of FIG. 1.

FIG. 3 is a flowchart representing different steps of executing an identification and location method executed during the operation of the identification and location device of FIG. 1.

DETAILED DESCRIPTION

In the following detailed description of the figures defined above, the same elements or the elements performing identical functions may retain the same references so as to simplify the understanding of the disclosure.

The disclosure concerns an identification and location device making it possible to remotely locate and identify predetermined areas Z, these areas Z possibly belonging to an environment around the receiver device R which will be detailed later, in particular a so-called nearby environment. The predetermined area Z can refer to a spatial area included in said nearby environment where a piece of furniture or an artwork is present, for example.

Identification and Location Device

According to one embodiment, the identification of the predetermined area Z is carried out at a distance of several meters, for example a distance of more than 4 meters.

The described identification and location device comprises a plurality of light radiation emission sources S located in the predetermined areas Z, each light radiation emission source S being connected to the electrical mains by a driving circuit and configured to emit modulated light radiation L, each area Z being equipped with such a light radiation emission source S, the light radiation L emitted by each light radiation emission source S being representative of a unique characteristic associated with the light radiation emission source S which emitted said light radiation L.

By light radiation it should be understood a light ray emitted by a light source such as a lamp for example, and therefore the light radiation emission source S can refer to a lamp for example.

The unique characteristic associated with each light radiation emission source S is an individual identifier which comprises a plurality of binary symbols. The unique characteristic can for example refer to an n-bit code, in particular a 32-bit code for example, the code being different for each predetermined area.

Each light radiation emission source S may comprise at least one light-emitting diode where each light-emitting diode has the ability to emit light radiation L when it is connected to the electrical mains through the driving circuit.

Advantageously, the use of a light radiation promotes the directivity of the emitted light radiation, in other words the light radiation follows a trajectory defined by a straight line.

According to one possibility, the light radiation can also designate ultrasound.

Advantageously, the driving circuit here has the particularity of being connected directly to the electrical mains, which considerably reduces the general manufacturing cost of the identification and location device.

The light-emitting diode can be an LED-type lamp driven by the driving circuit converting an alternating voltage into a direct or square-wave voltage.

Each light radiation emission source S may also include a non-isolated electrical rectifier circuit and a circuit for storing said unique characteristic associated with said light radiation emission source.

For the purposes of the disclosure, by non-isolated electrical rectifier circuit it should be understood a circuit that electrically converts an alternating current AC signal to a direct current DC signal comprising no isolation element such as a transformer for example.

According to one embodiment, the storage circuit is an electrically programmable non-volatile memory circuit such as an EPROM or EEPROM type memory for example.

The identification and location device also comprises a portable receiver device R capable of receiving and processing the light radiation L emitted by the light radiation emission sources S and configured to generate, for each received light radiation and by demodulation processing from said light radiation, an identification and location information relating to the predetermined area Z in which is located the light radiation emission source S which emitted this received and processed light radiation L.

Thus, for the purposes of the disclosure, the nearby environment can be defined as being located at a distance around the receiver device R such that the light radiation L emitted by the different sources S are all received by the receiver device R.

The receiver device R may comprise a detection component D represented in FIG. 1 which may be a photodetector component D such as a photodiode or a phototransistor for example and which is capable of detecting the light radiation L emitted by at least one among the light radiation emission sources S.

According to one possibility, the photodetector component D is integrated in an active pixel sensor, in particular a metal-oxide semiconductor active pixel sensor of the CMOS sensor type.

The detection component D converts, for example, the received light radiation into an electrical signal to be processed.

The receiver device R may comprise a processing circuit capable of processing by demodulation the received light radiation L and of identifying the unique characteristics associated with the emission sources S of the plurality of emission sources.

According to one possibility, the receiver device R is connected to a storage system storing location and identification information relating to the predetermined areas Z and making it possible to identify the identification and location information relating to a predetermined area Z from the identified unique characteristic associated with the light radiation emission source S located in this predetermined area Z, the storage system being comprised in a storage component or in a computer database accessible via an Internet network.

The identification of the unique characteristics associated with the emission sources S of the plurality of emission sources is done by comparing the unique characteristic associated with the light radiation emission source S with a reference location and identification information among location and identification information relating to the predetermined areas Z stored in a storage component of the receiver device R or stored in a computer database accessible via an Internet network.

The storage component can for example refer to a memory circuit of a microprocessor.

According to one possibility, the receiver device R also comprises a wired or wireless digital transmission element which can for example be used to transmit the individual identifier relating to the light radiation emission source to an operating device such as a mobile phone of the smartphone type.

At least one element, selected from the group comprising the light radiation emission sources S and the receiver device R, can comprise at least one optical component O shown in FIG. 1and selected from a focusing member capable of focusing all or part of the light radiation which goes from the emission source S to the receiver device R and an optical module comprising a masking member.

According to one embodiment, the light radiation focusing device L, which may for example refer to a converging lens, is placed on the detection component D.

The masking member can for example refer to a tube with a length substantially comprised between 5 mm and 10 mm and attached to the photodetector.

Operating Device

Each light radiation emission source S contains an electronic assembly capable of modulating the light radiation L emitted by it, and a storage circuit or memory circuit containing a unique digital identifier or unique 32-bit characteristic as well as modulating parameters of the light radiation L.

According to one embodiment, when the light radiation emission source S is electrically powered, the driving circuit modulates the light-emitting diode so that it emits the light radiation L with several distinct frequencies.

According to one embodiment, the frequency modulation of the light radiation can be a frequency shift keying, in other words an FSK type modulation.

Thus, as shown in FIG. 2, a first frequency f0 is associated with a first binary symbol such as a bit 0 for example and a second frequency f1 is associated with a second binary symbol such as a bit 1. A third frequency fb refers to a separation frequency between the first and second binary symbols and is used here in order to delimit frames of binary symbols corresponding to the unique 32 bits characteristic relating to the light radiation emission source S.

Each light radiation emission source S is therefore configured to emit modulated light radiation L.

According to one possibility, the light radiation L emitted by each light radiation emission source S is phase and/or frequency modulated.

The frequency and/or phase modulation of the light radiation in each light radiation emission source S can take place under the action of the driving circuit.

A heat effect induces frequency and time shifts generally more than 25%. Thus, the frequencies f0, f1, fb are not constant and can vary considerably; only the ratio between the frequencies can be considered constant.

Thus, according to one possibility, a substantially constant ratio exists between the values of the first, second and third frequencies f0, f1 and fb.

The light radiation L emitted by each light radiation emission source S is detected and then demodulated by the receiver device R.

The receiver device R uses a photodetector D such as a phototransistor for example in order to transform the light radiation L or the received light into an electrical signal.

This electrical signal is subsequently filtered and amplified in order to be transformed into a digitized signal by an electrical signal digitization circuit of the analog-digital converter type.

The receiver device R also comprises a processing circuit capable of processing by demodulation the received light radiation L and of identifying the unique characteristics associated with the emission sources S of the plurality of emission sources.

The processing circuit can for example refer to a processor or a microcontroller on which is executed a phase or frequency demodulation algorithm of the electrical signal originating from the light radiation L emitted by the emission source S and received by the receiver device R, as well as the electrical signal digitization circuit.

The frequency demodulation algorithm is used for example to extract frequencies comprised in the light radiation L emitted by the light radiation emission source S and received by the receiver device R and to associate the corresponding binary symbols therewith in order to extract the individual identifier relating to the light radiation emission source.

According to one embodiment, the frequency demodulation algorithm is an FSK demodulation algorithm, and in particular an FSK algorithm which takes into account the respective constant ratios between the first, second and third frequencies f0, f1 and fb.

According to one possibility, the receiver device R generates the identification and location information relating to the predetermined area Z by frequency demodulation processing when the light radiation L emitted by each emission source S is frequency modulated.

According to an alternative or combinable possibility, the receiver device R generates the identification and location information relating to the predetermined area Z by phase demodulation processing when the light radiation L emitted by each emission source S is phase modulated.

The identification and location information relating to a predetermined area Z is generated by the receiver device R following the frequency and/or phase demodulation of the emitted light radiation L or light signal.

Identification and Location Method

The disclosure also concerns an identification and location method making it possible to remotely locate and identify predetermined areas Z, these areas Z possibly belonging to a nearby environment around the receiver device R, and whose different steps are shown in FIG. 3.

The method firstly comprises a step A1 of arranging the plurality of light radiation emission sources S, where each predetermined area Z comprises at least one of said light radiation emission sources S, each light radiation emission source S being connected to the electrical mains by the driving circuit and configured to emit modulated light radiation L, a step A2 of modulating the light radiation L under the action of the driving circuit, the light radiation L being representative of the unique characteristic associated with the light radiation emission source S which is capable of emitting the light radiation L and then a step of emitting A3 the light radiation L towards the receiver device R.

According to one implementation, an emission duration of the light radiation at a frequency equal to the first frequency f0 is equal to an emission duration of the light radiation L at a frequency equal to the second frequency f1, and an emission duration of the light radiation at a frequency equal to the second frequency f1 is equal to an emission duration of the light radiation at a frequency equal to the third frequency fb.

The method also comprises a step of receiving and processing A4 by demodulation by the receiver device R at least one light radiation L emitted by the plurality of light radiation emission sources S.

The step of receiving and processing A4 the at least one light radiation may comprise the following sub-steps, also represented in FIG. 3, of:
- acquiring A4-1 at least one light radiation L emitted during an acquisition duration;
- converting A4-2 by the photodetector D comprised in the receiver device R the at least one acquired light radiation L into an electrical signal;
- dividing A4-3 the electrical signal into a plurality of analysis intervals;
- determining A4-4 a binary symbol relating to each analysis interval comprised in the plurality of analysis intervals based on a frequency or phase analysis of the electrical signal; and
- identifying A4-5 the unique characteristic associated with the light radiation emission source S which emitted the light radiation L based on the determination of the binary symbol relating to each analysis interval comprised in the plurality of analysis intervals.
- comparing A4-6 the unique characteristic associated with the light radiation emission source S with the reference location and identification information among location and identification information relating to the predetermined areas Z stored in the component storage of the receiver device R or stored in the computer database accessible via an Internet network.

According to one possibility, the acquisition duration of the light signal is calculated so as to take into account a sampling duration of the light signal, a time tolerance relating to the operation of the driving circuit and a minimum time interval necessary for the acquisition of the unique characteristic associated with the light radiation emission source S.

The division of the electrical signal into a plurality of analysis intervals can for example refer to a separation of the electrical signal into a plurality of time intervals during which the electrical signal has a frequency equal to the first frequency f0, or a frequency equal to the second frequency f1, or else a frequency equal to the third frequency fb.

According to one possibility, the determination of the binary symbol relating to each analysis interval is done by identifying a frequency predominantly present in each analysis interval. The identification of the predominantly present frequency can for example be done by a frequency analysis of the Fourier transform or FFT type.

If the unique characteristic relating to the light radiation source S consists of 32 bits with a value of 1 or 0 and if for each unique characteristic only two delimiting bits are used, it is possible to say that the emitted light radiation L essentially includes the first and second frequencies f0 and f1. It is then possible to perform an FFT on the digitized signal in order to determine a frequency predominantly present in the spectrum of frequencies present in the emitted light radiation L.

The first and second frequencies f0 and f1 can be selected so that the two frequencies have values that are far apart from each other.

The third frequency fb can be deduced from the first frequency f0 or from the second frequency f1 since a constant ratio exists between the frequencies.

In order to determine a beginning and an end of the unique characteristic relating to the light radiation source S, a location of the two delimiting bits in the emitted light radiation L is determined.

For this purpose, several known signal processing methods can be used such as a sliding DFT, a sliding Goertzel filter or any other method capable of detecting a target frequency in a signal. This makes it possible to obtain the beginning of the unique characteristic as well as its end in the emitted light radiation L.

The receiver device R is thus able to reconstitute by demodulation of the light radiation L emitted by each light radiation source S the unique characteristic relating to each light radiation source S.

The unique characteristic found by the receiver device R can be compared to a list of known reference location and identification information, each of the reference location and identification information of the list of reference location and identification information corresponding to a light radiation emission source S.

This step makes it possible to ignore any unique characteristic unknown to the processing circuit or resulting from a decoding error. The reference location and identification information list can be updated during the installation of the identification and location device or after an addition of a light radiation source to the light radiation sources S already present in the identification and location device.

The method also comprises a step of generating A5, for each received and processed light radiation, a location and identification information relating to the predetermined area Z in which is located the light radiation emission source S which emitted the received and processed light radiation L.

If, for example, the light radiation source S is placed on an artwork in a room in a museum, the receiver device R will be able to identify this artwork as well as give its exact location in the room in the museum.

According to one possibility, the method also comprises a step of transmitting A6, by the receiver device R, the location and identification information relating to the predetermined area Z in which is located the light radiation emission source S which emitted the received and processed light radiation L to an operating device.

The method may further advantageously comprise a detection of the interferences I of at least one emitted light radiation L from the light radiation emission source S serving to delimit and/or separate the predetermined areas Z.

In other words, the locations of the junctions between the predetermined areas Z are determined by the receiver device R in a very simple way, by determining places in space where it is not possible to implement the step of generating A5 a location and identification information.

Thus, for example, due to a property of light superposition, two light radiation sources S emitting a modulated light signal and placed close to each other will interfere with each other in their nearby environment depending both of their proximity and their intensity as shown in FIG. 1.

Thus, the interference areas I between the light signals originating from the light radiation sources S will generate errors, which will produce unique characteristics that are unknown and therefore ignored thereafter. The more the receiver device R will focus towards one of the light radiation sources, the lesser the interference from the other light radiation sources will have an effect on the demodulation algorithm. Thus, the interference areas constitute a natural geographic delimitation around the light radiation sources, thus allowing better location of said light radiation sources.

Although the disclosure has been described in connection with specific embodiments, it is obvious that it is in no way limited thereto and that it comprises all the technical equivalents of the described means as well as combinations thereof if these fall within the scope of the disclosure.

The invention claimed is:

1. An identification and location device making it possible to remotely locate and identify predetermined areas, in particular belonging to a nearby environment, said identification and location device comprising:
   a plurality of light radiation emission sources located in the predetermined areas, each light radiation emission source being connected to the electrical mains by a driving circuit and configured to emit a modulated light radiation, each area being equipped with such a light radiation emission source, the light radiation emitted by each light radiation emission source being representative of a unique characteristic associated with the light radiation emission source which emitted said light radiation; and
   a portable receiver device capable of receiving and processing the light radiation emitted by the light radiation emission sources and configured to generate, for each received light radiation and by demodulation processing from said light radiation, an identification and location information relating to the predetermined area in which is located the light radiation emission source which emitted this received and processed light radiation.

2. The identification and location device according to claim 1, wherein each light radiation emission source comprises at least one light-emitting diode where each light-emitting diode has an ability to emit the light radiation when it is connected to the electrical mains via the driving circuit.

3. The identification and location device according to claim 1, wherein each light radiation emission source includes a non-isolated electrical rectifier circuit and a circuit for storing said unique characteristic associated with said light radiation emission source.

4. The identification and location device according to claim 1, wherein the unique characteristic associated with each light radiation emission source S is an individual identifier which comprises a plurality of binary symbols.

5. The identification and location device according to claim 1, wherein the receiver device comprises a detection component capable of detecting the light radiation emitted by at least one of the light radiation emission sources.

6. The identification and location device according to claim 1, wherein the receiver device comprises a processing circuit capable of processing by demodulation the received light radiation and of identifying the characteristics associated with the emission sources of the plurality of emission sources.

7. The identification and location device according to claim 1, wherein the receiver device is connected to a storage system storing location and identification information relating to the predetermined areas and making it possible to identify the identification and location information relating to a predetermined area from the identified unique characteristic associated with the light radiation emission source located in this predetermined area, the storage system being comprised in a storage component or in a computer database accessible via an Internet network.

8. The identification and location device according to claim 1, wherein the receiver device comprises a digital transmission element.

9. The identification and location device according to claim 1, wherein at least one element, selected from the group comprising the light radiation emission sources and the receiver device, comprises at least one optical component selected among a focusing member capable of focusing all or part of the light radiation which goes from the emission source to the receiver device and an optical module comprising a masking member.

10. An identification and location method making it possible to remotely locate and identify predetermined areas, in particular belonging to a nearby environment, the method comprising the following steps of:
   arranging a plurality of light radiation emission sources, where each predetermined area comprises at least one of said light radiation emission sources, each light radiation emission source being connected to the electrical mains by a driving circuit and configured to emit modulated light radiation;
   modulating the light radiation under the action of the driving circuit, the light radiation being representative of a unique characteristic associated with the light radiation emission source which is capable of emitting the light radiation;
   emitting the light radiation towards a receiver device;
   receiving and processing by demodulation by the receiver device at least one light radiation emitted by the plurality of light radiation emission sources; and
   generating, for each received and processed light radiation, a location and identification information relating to the predetermined area in which is located the light radiation emission source which emitted the received and processed light radiation.

11. The method according to claim 10, further comprising a step of transmitting, by the receiver device, a location and identification information relating to the predetermined area in which is located the light radiation emission source which emitted the received and processed light radiation to an operating device.

12. The method according to claim 10, wherein the step of receiving and processing the at least one light radiation comprises the following sub-steps of:
   converting by a photodetector comprised in the receiver device at least one acquired light radiation into an electrical signal;
   dividing the electrical signal into a plurality of analysis intervals;

determining a binary symbol relating to each analysis interval comprised in the plurality of analysis intervals based on a frequency or phase analysis of the electrical signal; and identifying the unique characteristic associated with the light radiation emission source which emitted the light radiation based on the determination of the binary symbol relating to each analysis interval comprised in the plurality of analysis intervals.

13. The method according to claim 10, wherein the step of receiving and processing the at least one emitted light radiation further comprises the following sub-steps of:

acquiring at least one light radiation emitted during an acquisition duration; and comparing the unique characteristic associated with the light radiation emission source with reference location and identification information among location and identification information relating to the predetermined areas stored in a storage component of the receiver device or stored in a computer database accessible via an Internet network.

\* \* \* \* \*